July 23, 1946.　　　　F. W. MEYER　　　　2,404,515
HYDRAULIC FLY WHEEL
Filed June 16, 1944　　　　2 Sheets-Sheet 2

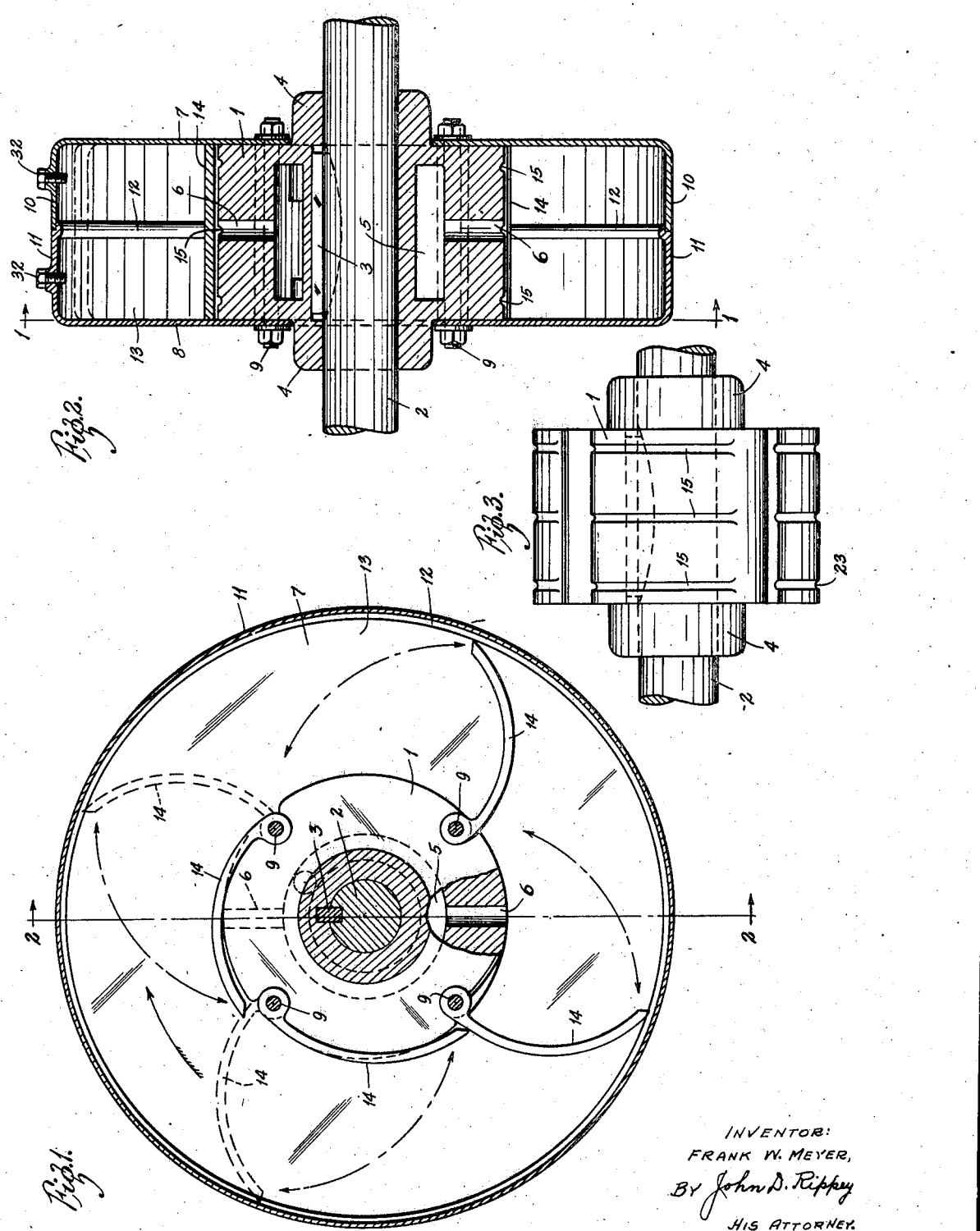

INVENTOR:
FRANK W. MEYER,
By John D. Rippey,
His ATTORNEY.

Patented July 23, 1946

2,404,515

UNITED STATES PATENT OFFICE 2,404,515

HYDRAULIC FLYWHEEL

Frank W. Meyer, East St. Louis, Ill.

Application June 16, 1944, Serial No. 540,719

2 Claims. (Cl. 74—572)

This invention relates to hydraulic fly wheels.

An object of the invention is to provide an improved hydraulic fly wheel having relatively thin walls forming an annular chamber in the body and around the hub of the wheel and arranged to be filled completely with liquid, and a hub attached to and supporting said thin walls of said body and formed with an annular compartment therein provided with a port communicating with said chamber through which liquid may pass, in combination with a valve device controlling an effluent passage from said compartment which will open to permit escape or discharge of liquid when more liquid is delivered into the fly wheel under pressure than is required to fill the same, and to provide an expansion device in communication with said chamber which will move under pressure of said liquid to permit an additional amount of liquid to be placed in said compartment and said chamber before said valve will open to permit any discharge thereof.

Another object of the invention is to provide an improved hydraulic fly wheel embodying the structure mentioned and having a series of arcuate vanes pivotally supported within the annular chamber for movement to positions extending across said chamber and thereby prevent or retard the movement or flow of liquid, particularly when the speed of rotation of the fly wheel becomes suddenly reduced below the speed of movement of said liquid in said chamber.

Another object of the invention is to provide an expanding device for increasing the aggregate cubical area within said chamber and said compartment and thereby increasing the cubical content of liquid that may be retained therein before any discharge of liquid is effected through a valve device provided for that purpose.

Other objects will appear from the following description, reference being made to the annexed drawings, in which—

Fig. 1 is a cross-sectional view transversely of the axis of my improved fly wheel on the line 1—1 of Fig. 2, showing a modification in which the vanes are pivotally supported near the hub.

Fig. 2 is a longitudinal sectional view through and parallel with the axis of my improved fly wheel on the line 2—2 of Fig. 1.

Fig. 3 is a side elevation showing a preferred construction of the hub of my improved hydraulic fly wheel in the modification of Figs. 1 and 2.

Figure 4:
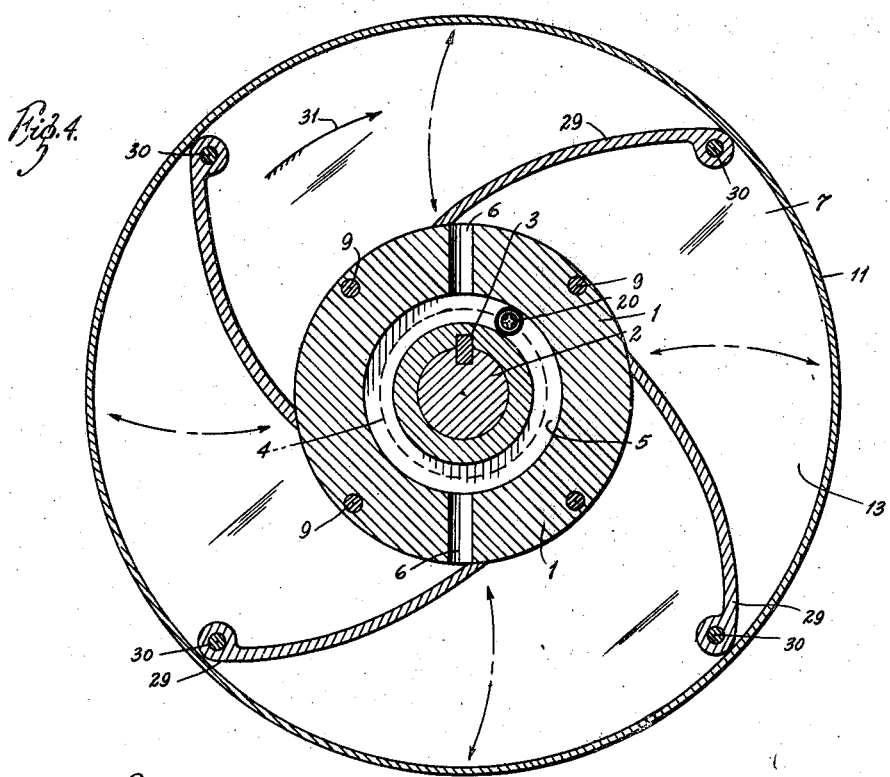
Fig. 4 is a cros-sectional view transversely of the axis showing a modification of my improved fly wheel in which the vanes are pivotally supported near the periphery instead of near the hub of the fly wheel as in Fig. 1.

This application is a continuation in part of my application Serial No. 447,173, filed June 15, 1942.

In each modification shown, the hub of my improved hydraulic fly wheel comprises a body 1 attached to a driven rotary shaft 2 by a spline 3. The hub ends 4 are attached to the body 1 by welding when said parts are composed of metal and forming hermetic or leakproof joints. The body 1 is hollow, having therein an annular compartment 5, and a number of passages 6 from said compartment to the periphery of the hub.

Two relatively thin metallic radial walls 7 and 8 are rigidly attached to the ends of the hub 1 by bolts 9. Said walls 7 and 8 may also be welded or otherwise attached to the ends of said hub in order to form hermetic joints and prevent leakage of liquid from within the fly wheel. The walls 7 and 8 are of annular form, so that the hub ends 4 may project through and beyond said walls, as shown (Fig. 2). The wall 7 is formed with an integral annular flange 10 abutting against the edge of a complementary annular flange 11 which is integral with the wall 8. The flanges 10 and 11 extend toward and into abutting contact with each other. One of said flanges is formed with an integral annular bead 12 overlapping and attached to the inner margin of the other flange by welding or otherwise to form a leakproof and hermetic joint. The direct integral attachment of the flanges 10 and 11 to each other by welding or the like positively prevents the walls 7 and 8 from spreading apart at their periphery and thus prevents leakage of any of the liquid content of the fly wheel between the flanges 10 and 11. The hub 1, the walls 7 and 8, and the flanges 10 and 11 cooperate to form an annular chamber 13 in the fly wheel. The chamber 13 has direct communication with the compartment 5 through ports 6 through which liquid may pass freely from the chamber 13 into the compartment 5, and vice versa.

In the modification shown in Fig. 1, a vane 14 is pivoted on each bolt 9 for inward and outward swinging movements. These vanes preferably have a curvature nearly concentric with the periphery of the hub 1 and with the axis of the shaft 2. Said vanes may swing from positions adjacent to the periphery of the hub 1, as shown by solid lines at the top and at the left of Fig. 1, to outwardly extended positions in which the free ends of said vanes engage or are close to the inner periphery of the flanges 10—11 or the rib 12, as shown by solid lines at the bottom of Fig. 1 and by solid lines at the top. When the fly wheel is stationary, these vanes may move freely to the position to which they are impelled by gravity, as shown by solid lines in Fig. 1. Thus, the vanes which are impelled by gravity to positions in which they extend across the chamber 13 will remain or will move downwardly to the positions in which two of said vanes are shown at the lower side of Fig. 1. The other vanes will be impelled by gravity to positions adjacent to the periphery of the hub 1. When the fly wheel is started, the liquid therein may be caused to rotate or move with the fly wheel. In order to permit passage of liquid under the vanes 14 and prevent adhesion of said vanes to the periphery of the hub while leaving said vanes freely movable, a number of grooves 15 are formed in the periphery of the hub 1.

Figure 5:
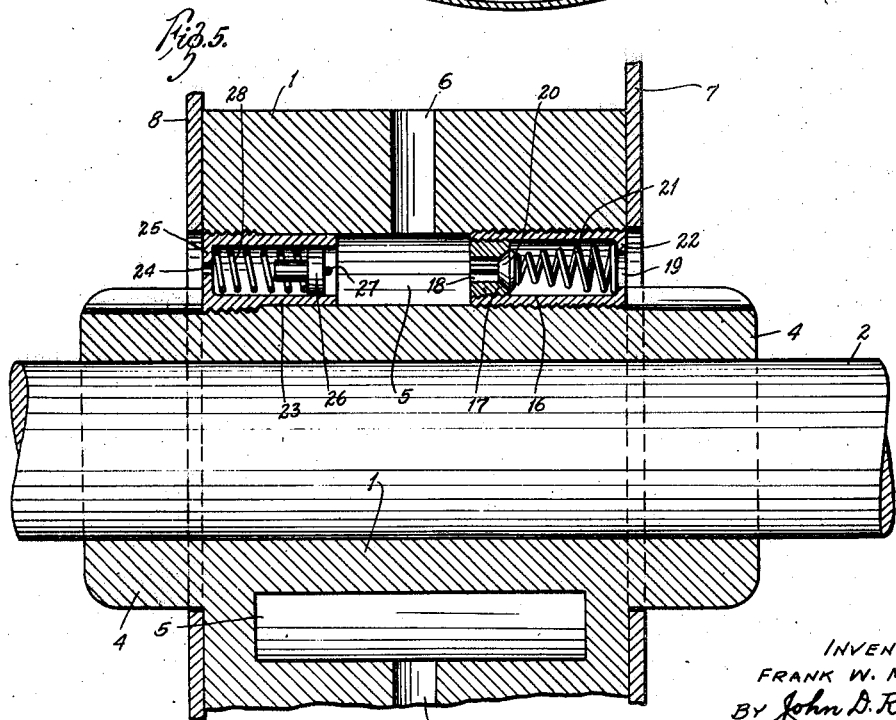
Fig. 5 is an enlarged sectional view showing the relief valve and an expanding device for increasing the aggregate cubical area of the interior of the fly wheel, and thereby increasing the cubical content of liquid that may be retained therein.

As shown in Fig. 5, a device is provided to permit discharge of liquid from the fly wheel when the pressure of the liquid contained therein approximates, but is less than the pressure required to distort or burst the fly wheel. Said device comprises a valve cage 16 detachably secured in the compartment 5 and having a valve seat 17 mounted in its inner end and formed with a port 18 in communication with the compartment 5, and also having a port 19 formed in its outer end. Said device also comprises a valve 20 mounted in the cage 16 for movement to and from the valve seat 17, and yieldingly held against said valve seat by a spring 21 mounted in the valve cage between the valve 20 and an annular flange 22 in the outer end of said cage. The spring 21 will yield under predetermined pressure less than that required to distort or burst the walls 7 and 8 of the fly wheel. When the pressure of the liquid in the fly wheel becomes excessive or increases beyond the desired maximum less than the pressure that will distort or burst the walls 7 and 8, such pressure acting against the inner side of the valve 20 will move said valve to open position away from the valve seat 17 in opposition to the spring 21, thereby opening the port 18 and permitting outflow of a part of the liquid from within the fly wheel. When the volume and pressure of the liquid in the fly wheel becomes reduced in this manner below the predetermined maximum, the spring 21 will automatically move the valve 20 against the seat 17, thereby closing said valve and preventing outflow of any further amount of liquid from the fly wheel.

A device for varying the aggregate cubical area of the compartment 5 and chamber 13, including the ports 6, forms a part of either modification of my invention. Said device operates to increase said aggregate cubical area. As shown in Fig. 5, a cylinder 23 is detachably mounted in one end of the hub 1 and opens into the compartment 5. Preferably, for balancing purposes the cylinder 23 is in the opposite end of the hub 1 from the valve device that permits discharge of liquid from the fly wheel under conditions of excessive pressure less than the pressure that will distort or burst the wheel. The cylinder 23 has an open inner end, and has a port 24 through its outer end wall 25. A piston 26 is mounted for sliding movements within the cylinder 23 and forms a leakproof joint with the inner periphery of said cylinder. In order to provide a leakproof joint between the cylinder 23 and the piston 26, any known or appropriate gasket or sealing device (not shown) may be provided on said piston. The inner end of the cylinder 23 supports an abutment 27 for limiting inward movement of the piston 26 and leaving said piston free for outward movement. A spring 28 is mounted within the cylinder 23 between the end wall 25 and the piston 26, and yieldingly holds said piston against the abutment 27. The spring 21 is much stronger than the spring 28 and will only yield under predetermined pressure largely in excess of that required to operate the spring 28 but less than that required to damage, distort or burst the walls 7 and 8 of the fly wheel. When the pressure in the fly wheel increases by increase in the volume of the cubical content of the liquid therein from any cause, the piston 26 will be moved outwardly in the cylinder 23 to increase the aggregate cubical content within the fly wheel and compensate for increase in the volume of the cubical content of the liquid therein. Continued increase of the pressure in the fly wheel beyond a predetermined maximum, that is, when the pressure in the fly wheel becomes excessive, the valve 20 will be opened by such pressure and permit outflow of a part of the liquid from the fly wheel. This occurs before the pressure causes damage to, or bursting or distortion of the wheel. The piston 26 impelled by the spring 28 functions to eject or cause outflow of a part of the liquid when the valve 20 is opened as described. That is, the spring 28 moves the piston 26 toward the abutment 27 as the amount of liquid in the fly wheel diminishes.

In the modification shown in Fig. 4, the vanes 14 are omitted and vanes 29 are substituted therefor. The said vanes 29 are mounted on pivots 30 supported by the walls 7 and 8 parallel with the axis of the shaft 2 and adjacent to the flanges 10 and 11. The free ends of the vanes 29 may move into contact with the periphery of the hub 1 when the fly wheel is rotating in the direction of the arrow 31, as shown in Fig. 4. When the fly wheel is at rest, the vanes 29 may move freely on their pivots 30 just as the vanes 14 move freely on their pivots 9. In this modification of the invention, the grooves 15 are omitted. Otherwise, the fly wheel of Fig. 4 embodies all of the parts before described, and like reference numerals are applied to said parts, as in the first modification.

After the fly wheel of either modification has been assembled, the chamber 13, ports 6, and compartment 5 are completely filled with liquid through an inlet port provided for that purpose. Two such ports are shown in Fig. 2, and each is provided with a removable and replaceable plug 32 which may be screwed into its port and then may be welded or otherwise sealed when secured in position to provide leakproof and hermetic joints. When the fly wheel is to be intially filled with liquid, at least one, and preferably both, of the plugs 32 are removed to admit liquid into said chamber and permit air to pass therefrom. After the fly wheel is completely filled with liquid, that is, after the chamber 13, compartment 5, and ports 6 are completely filled with said liquid, the plugs 30 are secured in position to close their respective ports in order to form leakproof and hermetic joints. Complete filling of the fly wheel with liquid in the manner described, including the chamber 13, compartment 5, and ports 6, will not move the piston 26, but will leave said piston against the abutment 27 for operation as above described.

It should now be apparent that this invention attains all of its intended objects and purposes in a desirable manner. It saves a considerable amount of metal and provides a fly wheel that can practicably be dismantled or separated for purposes of repair or replacement of parts, or for other needed purposes. The construction of the device may be varied otherwise than in the particulars specifically mentioned and shown without departure from the nature and principle of the invention.

I claim:

1. In a fly wheel having a hub attached to a driven rotary shaft for rotation thereby and walls attached to the ends of said hub forming an annular chamber about the hub adapted to receive a quantity of liquid, the improvement comprising an annular compartment in the hub, ports opening from said compartment to the periphery of the hub, an expanding device for increasing the aggregate cubical area within said compartment operating under pressure of liquid therein, and a valve device operating under pressure of liquid in said compartment for discharging liquid therefrom under pressure greater than the pressure that operates said expanding device.

2. In a fly wheel having a hub attached to a driven rotary shaft for rotation thereby and walls attached to the ends of said hub forming an annular chamber about the hub adapted to receive a quantity of liquid, the improvement comprising a compartment within the hub, ports from said compartment to the chamber, a valve regulating discharge of liquid from said compartment, a spring for holding said valve closed and yielding by pressure of liquid against said valve to discharge liquid from said compartment under pressure less than the pressure required to distort said walls, an expanding device for increasing the aggregate cubical area within said compartment operating under pressure of liquid therein, and a spring yieldingly holding said device in position for operation by pressure of said liquid and arranged to yield under less pressure of said liquid than the pressure required to operate said first spring and open said valve.

FRANK W. MEYER.